(No Model.)

H. H. TURNER.
PHOTOGRAPHIC LENS.

No. 577,891.  Patented Mar. 2, 1897.

Witnesses:
Chas. R. Osgood
Co. G. Cramwell

Inventor
Henry H. Turner
By Geo. B. Selden,
atty.

UNITED STATES PATENT OFFICE.

HENRY H. TURNER, OF ROCHESTER, NEW YORK, ASSIGNOR TO THE GUNDLACH OPTICAL COMPANY, OF SAME PLACE.

PHOTOGRAPHIC LENS.

SPECIFICATION forming part of Letters Patent No. 577,891, dated March 2, 1897.

Application filed September 8, 1896. Serial No. 605,114. (No model.)

*To all whom it may concern:*

Be it known that I, HENRY H. TURNER, a citizen of the United States, residing at Rochester, New York, have invented certain Improvements in Photographic Lenses, of which the following is a specification, reference being had to the accompanying drawings.

My invention relates to certain improvements in the construction of lenses for photographic cameras, which improvements are fully described and illustrated in the following specification and the accompanying drawings, the novel features thereof being specified in the claims annexed to the said specification.

Figure 1:
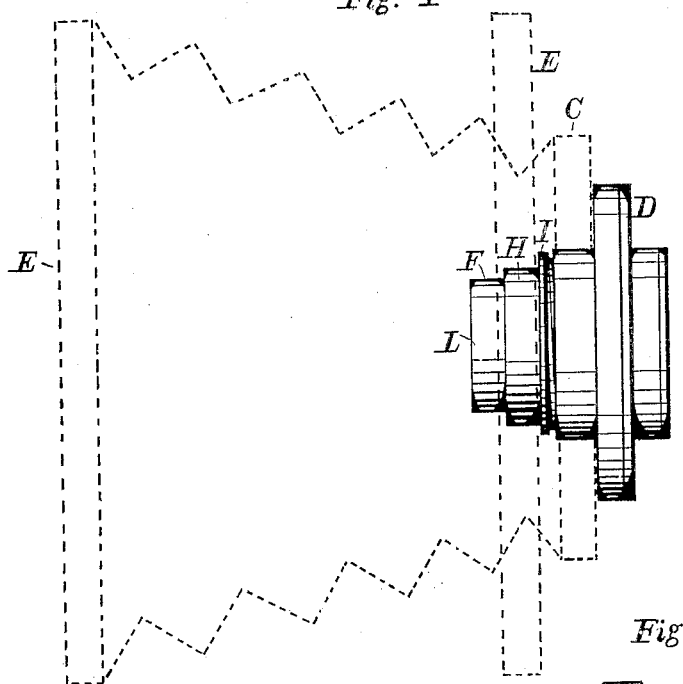
Figure 2:
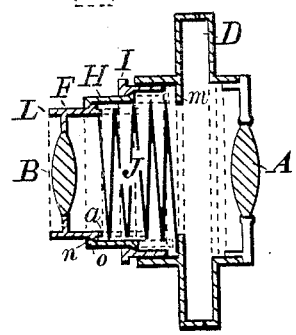
Figure 3:
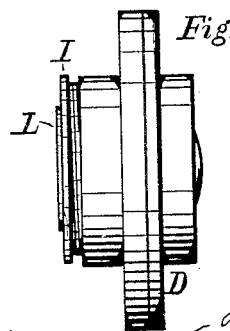

In the accompanying drawings, representing my improvements in photographic lenses, Figure 1 is a longitudinal section of a camera and a side elevation of the lens. Fig. 2 is a central longitudinal section of the lens. Fig. 3 is a side view of the lens collapsed.

The object of my invention is to provide a lens which can be collapsed to suit the very thin cameras which are now coming into use. In order to secure the desired compactness, manufacturers of cameras have been compelled to use lenses too short to secure proper definition on the plate, but by my invention cameras can be made even thinner than heretofore, and still the lens is of sufficient length when in use to permit the optical combinations to be placed at the distance apart requisite to secure the best results. For this purpose I mount the rear lens or combination in a collapsible tube, which, when the camera is collapsed, is forced within the front part of the lens-mount, but when the camera is again opened for use is thrust backward by a spring into the proper position for any given dimensions of lens or plate.

In the accompanying drawings, A represents the front lens or combination, and B the rear lens or combination.

C is the front of the camera, and D the plate by which the lens-mounting is secured to the front. A suitable shutter may be placed in the plate D, which may be made double for this purpose.

E is the back of the camera, carrying the focusing-screen or plate-holder, and which, when the camera is collapsed, as indicated by the dotted lines in Fig. 1, shuts up the lens B within the lens-mount (see Fig. 3) and permits the camera to be made much thinner than heretofore. The camera may be provided with the usual bellows, or other provision made for its collapse.

The rear lens or combination is mounted in a tube F, which slides within an outer tube H, which itself slides in a portion of the lens-mount. In the construction shown in the accompanying drawings the tube H slides within a threaded collar I, which is itself screwed into a suitable circular flange on the plate D. A spring J is placed within the collapsible portion of the lens-mount for the purpose of bringing the lens B into proper position when the camera is distended for use. This spring bears at its rear end against the front end of the tube F outside a flange $a$, which projects forward from the front end of the tube and serves to retain the rear end of the spring J in place. At its forward end the spring J bears on an inwardly-projecting flange $m$ on the lens mount or plate. The spring is preferably made larger or tapering toward its forward end.

In order to insure the proper centering of the rear lens relative to the front lens, the tube F is provided with a beveled or conical ring $n$, projecting outward and fitting a similar conical or beveled collar $o$, projecting inward on the rear end of the tube H or on the collar I or the lens-mount. By this construction the sliding friction may be reduced to the least possible amount, and yet the correct centering of the lens secured. A similar arrangement may be adopted between the tube H and the collar I or the lens-mount. The tube F preferably projects rearward, as indicated at L, Fig. 2, in order to protect the rear lens or combination.

It will be understood that my invention is applicable to any kind of double lenses and to any size or dimensions of photographic cameras, and that by its use I am enabled to put a high-grade lens into cameras about one-half thinner than any heretofore made.

Any suitable means may be adopted for attaching the plate or film holder to the back of the camera.

I claim—

1. The combination with the collapsible body of a camera, of a collapsible-lens mount, having a movable rear lens, adapted to be collapsed by the closing of the camera and a spring for expanding the lens-mount when the camera is opened, substantially as described.

2. The combination with the collapsible body of a camera, of a collapsible-lens mount, having a movable rear lens, adapted to be collapsed by the closing of the camera, and a spring for expanding the lens-mount when the camera is opened, and means for centering the lenses when the lens-mount is extended, substantially as described.

3. The combination with the lens A of a suitable lens-mount, the movable lens B, sliding tube F and spring J, substantially as described.

4. The combination with the lens A of a suitable lens-mount, having interior beveled flange o, the movable lens B, sliding tube F, having outer beveled flange n, and the spring J, substantially as described.

5. The combination with the lens A of a suitable lens-mount, the threaded collar I, one or more sliding tubes F H, and the spring J, substantially as described.

HENRY H. TURNER.

Witnesses:
GEO. B. SELDEN,
GEO. WILSON.